United States Patent [19]

Kimmel et al.

[11] Patent Number: 5,264,778
[45] Date of Patent: Nov. 23, 1993

[54] APPARATUS PROTECTING A SYNCHRONOUS MACHINE FROM UNDER EXCITATION

[75] Inventors: Donald S. Kimmel, Fletcher; Charles R. Mummert, Hendersonville both of N.C.; Kenneth M. Eichler, Murrysville; David R. Markus, Monroeville, both of Pa.

[73] Assignee: Westinghouse Electric Corp., Pittsburgh, Pa.

[21] Appl. No.: 815,676

[22] Filed: Dec. 31, 1991

[51] Int. Cl.⁵ .............................................. H02P 9/14
[52] U.S. Cl. ........................................ 322/25; 322/28; 322/99
[58] Field of Search ............... 322/22, 23, 24, 25, 322/28, 33, 46, 47, 59, 90, 99, 14, 15

[56] References Cited

U.S. PATENT DOCUMENTS 4,245,182  1/1981  Aotsu et al. .................... 322/25 X

FOREIGN PATENT DOCUMENTS

| 0054111 | 5/1977 | Japan | 322/25 |
| 0062612 | 5/1977 | Japan | 322/99 |
| 0892639 | 12/1981 | U.S.S.R. | 322/46 |
| 0917296 | 3/1982 | U.S.S.R. | 322/33 |
| 2037463 | 7/1980 | United Kingdom | 322/24 |

*Primary Examiner*—Kristine L. Peckman
*Attorney, Agent, or Firm*—M. J. Moran

[57] ABSTRACT

Apparatus for protecting a synchronous generator from under-excitation, includes a limiter implemented as part of a microprocessor based voltage regulator. The limiter selectively characterizes one or more limiting parameters, such as, system stability, machine capability and loss of field protection, as straight line segments in the real/reactive power plane to provide versatile, easily modified limits on excitation.

7 Claims, 5 Drawing Sheets

APPARATUS PROTECTING A SYNCHRONOUS MACHINE FROM UNDER EXCITATION

BACKGROUND OF INVENTION

1. Field of the Invention

This invention relates to control systems for synchronous machines, and more particularly, to an under-excitation limiter for a microprocessor based automatic voltage regulator for a synchronous generator connected to a power grid system.

2. Background Information

The increased growth of power generation and distribution systems requires improved methods of controlling power system electrical quantities. System stability becomes more and more important as the systems grow larger. One of the major determinants of system stability is automatic voltage regulation equipment for synchronous generators. The primary function of this equipment is to control the individual machine terminal voltage. The modern voltage regulator must be more than a regulator of voltage. It must be supplemented by other controls that directly affect system stability; such as the Minimum Excitation Limiter (MEL).

MEL equipment is typically used with, and made part of, the voltage regulation equipment for synchronous generators. The function of the minimum excitation limiting equipment is to maintain the excitation of a synchronous machine above a predetermined MVA characteristic. This strategy will prevent such a machine from reaching an under-excited condition that would endanger its synchronization with the power system, and adversely affect overall system stability. The MEL acts through the voltage regulator to manipulate machine excitation.

In order for a synchronous machine to maintain synchronism with the balance of the system, certain relationships must exist between terminal voltage, real power and reactive power. This relationship is termed the "static stability limit" (SSL) of the machine. The common model of a synchronous generator connected to a power system characterizes the static stability limit as a sector of a circle in the real/reactive power plane.

A second relationship relates to the safe operation of the generator itself, rather than to the stability of the system. It is known as the generator capability curve. This curve establishes limits to protect the machine from thermal damage. Actually, a family of curves dependent on cooling effectiveness can be generated for a given machine. Any curve from this family when plotted in the real/reactive power plane is substantially different from, but generally intersects, the SSL curve. The machine capability curves are used in the design of synchronous generators, but to our knowledge are not used to influence the control of a synchronous machine in real time.

A common minimum excitation limiter for synchronous generators is an analog device having a response characteristic which correlates fairly well with the SSL curve. These limiters do not correlate well at all with, and in fact, do not even take into account, the machine capability curves.

Synchronous generators are also protected by a loss of field relay which disconnects the generator from the grid if the field current is very low. Generally, the operating characteristic for the loss of field relay is a straight line in the real/reactive power plane, but outside the limits set by the SSL. However, in some applications, where the SSL is not a real concern, it could be that a utility would want to employ the minimum excitation limiter to correlate with the loss of field relay and raise the excitation to avoid unnecessary trips with the loss of field relay. As the SSL is characterized as an arc of a circle, it does not correlate well with the straight line loss of field relay characteristic.

There is a need therefore for improved protection for synchronous generators from under-excitation.

There is a further need for apparatus which provides more flexible protection, and more particularly which allows for selective better correlation with one or more protection characteristics.

There is also a need for such improved apparatus which can accommodate for changes in operating characteristics of the synchronous generator, such as changes in the cooling effectiveness.

Specifically, there is a need for such improved apparatus which allows a utility the opportunity to provide protection for a synchronous generator which correlates well with the machine capability limits.

There is a further need for such apparatus which allows a utility the opportunity to provide protection for a synchronous generator which correlates well with a loss of field relay.

SUMMARY OF THE INVENTION

These and other needs are satisfied by the invention which is directed to flexible, versatile, apparatus protecting a synchronous generator from under-excitation. It includes, as one aspect, providing a minimum excitation limit which is characterized as a function of the machine capability curve to provide on-line protection from overheating of the machine.

In a broader sense, the invention is directed to providing protection from under-excitation through a microprocessor based voltage regulation system. The minimum limit on excitation is characterized by one or more straight line segments which can be readily adjusted to accommodate changing conditions. Depending upon the application, one of several limiting protection characteristics such as the system stability limit, machine capability curves, or loss of field relay can be approximated well by straight line segments. Alternatively, a protection characteristic incorporating more than one limit can be generated. For instance, a characteristic combining the system stability limit and machine capability limit can be implemented by two intersecting line segments.

The limit characteristics can be easily adjusted merely by redesignating the two points that define the line segments. These adjustments to accommodate for changing conditions can be entered manually by the operator or can be made automatically. For instance, where the machine capability curve is being used to define the limit, the limit can be automatically shifted in response to a signal indicating a change in cooling effectiveness, such as represented by a change in the pressure of coolant circulated through the machine.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
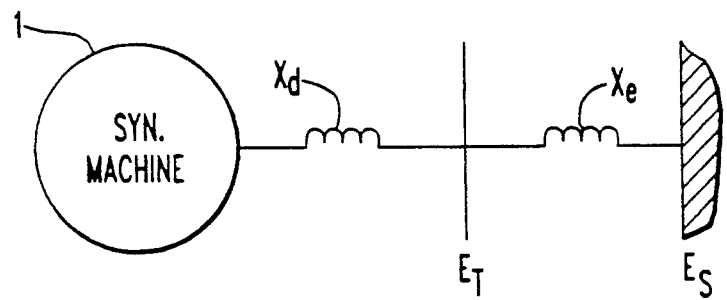
FIG. 1 is a schematic diagram of a stability model for a synchronous machine connected to a power system.
Figure 2:
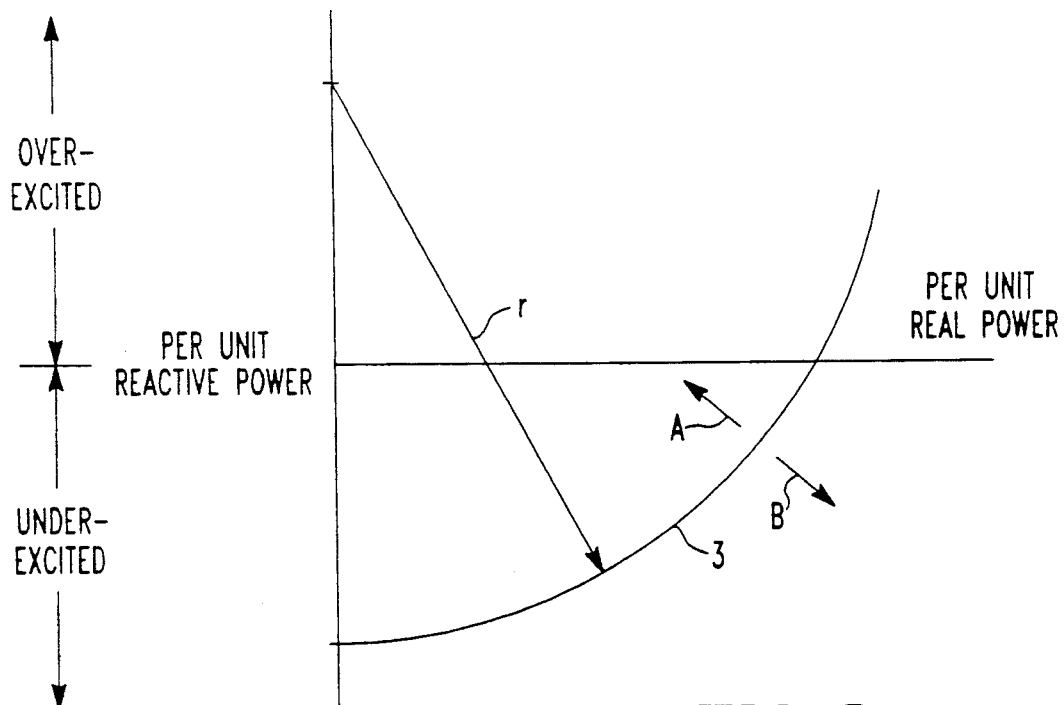
FIG. 2 is a plot of a static stability curve for the model of FIG. 1.

A typical model of a synchronous generator connected to a power system is shown in FIG. 1. The synchronous machine 1 is modeled as having an impedance $X_d$ which is primarily inductive connected to a power grid which has an impedance $X_e$ which is also primarily inductive. The terminal voltage on the machine 1 is $E_T$ and the system voltage is $E_S$. In a large system, the system voltage $E_S$ generally is not affected appreciably by the individual machine, and in fact, the system voltage determines the terminal voltage of the machine. The stability limit curve 3 for the model of FIG. 1 is shown in FIG. 2. This curve 3 is a sector of a circle in the real/reactive power plane having a radius r centered on the vertical axis. Both the center and radius r of curve 3 are functions of the machine terminal voltage. Synchronous operation occurs in the area A above and to the left of the static stability limit curve 3, while non-synchronous operation occur in the area B and to the right and below of the curve 3.

Figure 3:
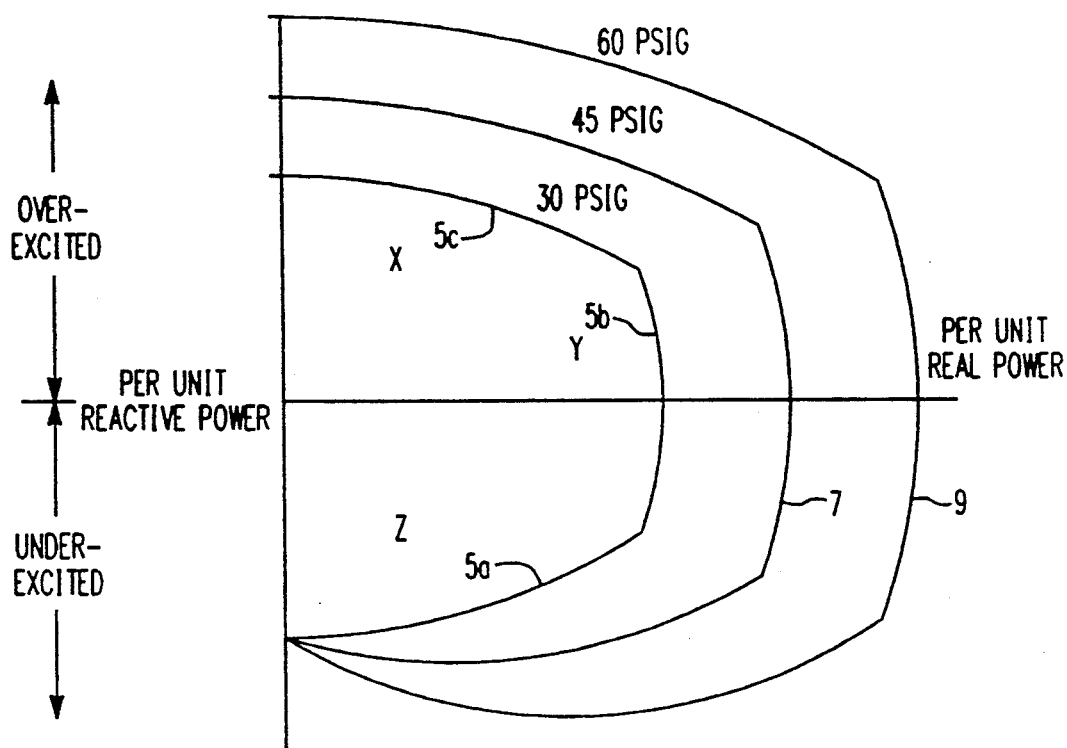
FIG. 3 is a plot of a family of generator capability curves for a synchronous generator.

FIG. 3 illustrates a typical set of generator capability curves. Three such curves 5, 7, and 9 are illustrated. Each of these curves has three distinct sections; a lower portion such as 5a, which is an arc of a circle, a generally vertical section 5b which is also an arc of a circle of a different radius and different center, and an upper portion 5c which is generally parabolic. The curves 5, 7, and 9 represent the machine capability limit for a particular machine for the three cooling gas pressures indicated in FIG. 3. The machine capability limit provides protection from overheating of the machine. For a machine operating in the region X in FIG. 3, the limiting factor is the rotor winding temperature. The limiting factor in the region Y is the stator winding temperature, and in the region Z the stator core temperature is the limiting factor. As mentioned previously, these generator capability curves are used to date only for design of a particular machine, and not for real time control.

Figure 4:
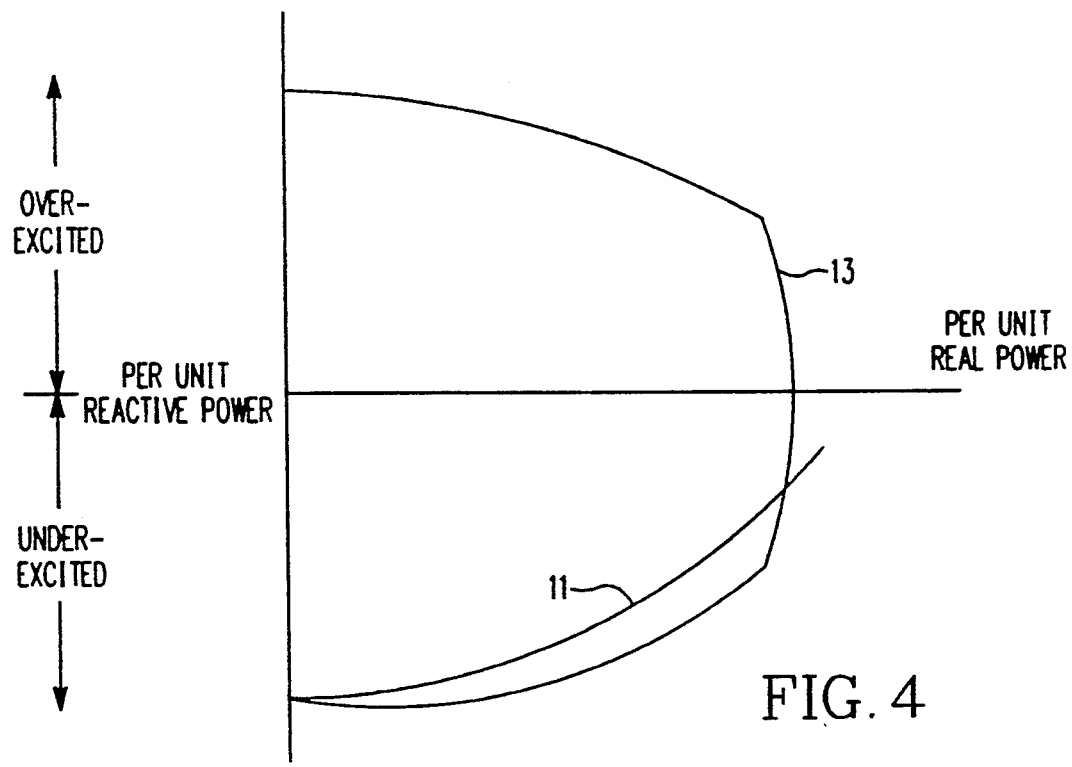
FIG. 4 is a plot illustrating a capability curve and system stability limit curve relationship.

FIG. 4 illustrates an exemplary relationship between a static stability limit curve 11 for a particular machine, and a machine capability curve 13 for the same machine under particular operating conditions. It can be seen that while under some conditions, the SSL curve would provide adequate protection for the machine, it is apparent that under other conditions, this would not be so. Likewise, there are operating conditions under which the machine capability curve would not be within the static stability limit.

Figure 5A:
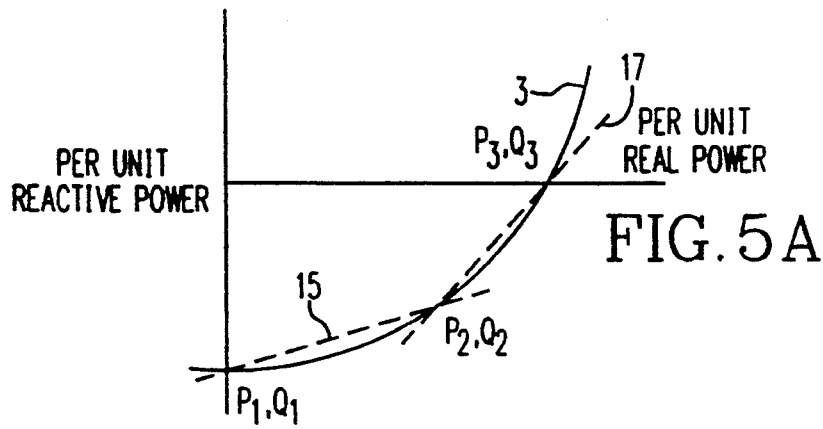
FIGS. 5A, 5B, 5C and 5D illustrate straight line approximations implemented by the present invention for providing protection which correlates with the static stability limit, the generator capability curve, the loss of field relay and a combination of the static stability limit and the generator capability curve, respectively.

The invention is directed to a flexible microprocessor based system which permits the user to customize, and to readily modify the characteristic of, a minimum excitation limiter for particular circumstances. As one aspect of the invention, the selected protection limit is characterized as one or more straight line segments in the real/reactive power plane. FIG. 5A illustrates that the static stability limit curve 3 can be characterized by two straight line segments 15 and 17, each of which is defined by two points P1, Q1, - P2, Q2, and P2, Q2 - P3, Q3, respectively. Such straight line segments are easily accommodated by a microprocessor, and as they are defined by two points, they can be modified easily by merely changing the coordinates of the points. Nominal values for these points are set by the operator for rated machine terminal voltage. The processor manipulates these coordinate values to accommodate for changes in terminal voltage.

Figure 5B:
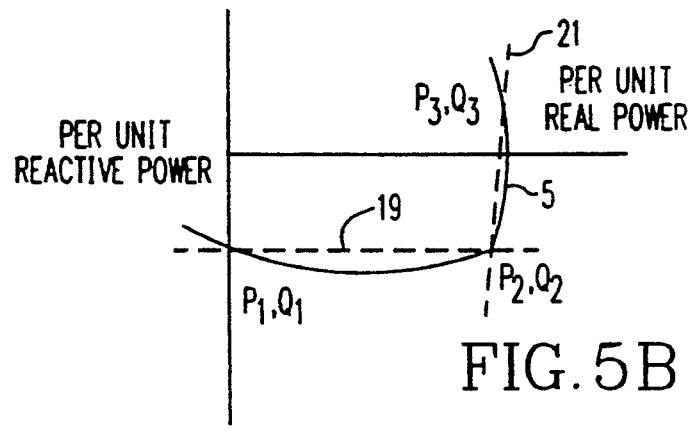

FIG. 5B illustrates characterization of the generator capability curve 5 by the two straight line segments 19 and 21. For the minimum excitation limiter, the upper portion of the machine capability curve is not relevant in protecting the machine from under-excitation.

Figure 5C:
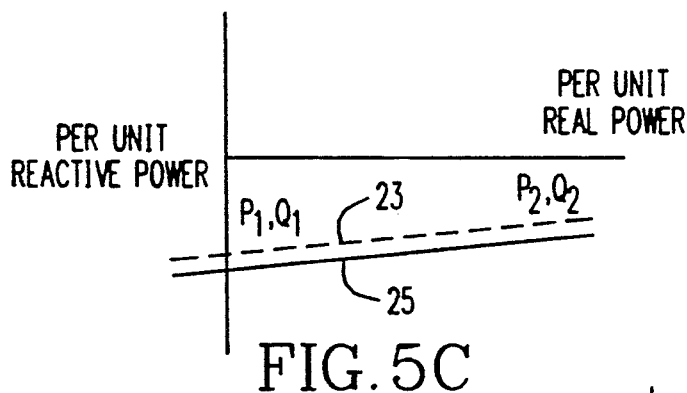

FIG. 5C illustrates that a single straight line segment 23 can be used to correlate the minimum excitation limiter with the straight line characteristic 25 of a loss of field relay.

Figure 5D:
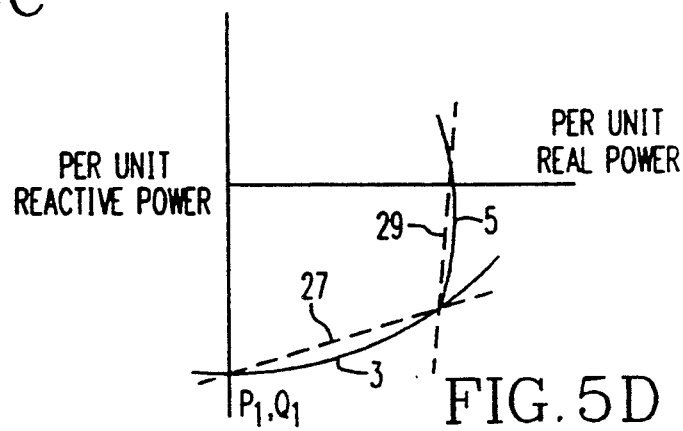

FIG. 5D illustrates a protection characteristic which combines static stability protection and machine capability protections by the single line segments 27 and 29, respectively.

It will be apparent from the above that any number of straight line segments can be assembled to generate a desired protection characteristic for the minimum excitation limiter. It will also be apparent that various protection limits can be combined, with the largest minimum excitation limit prevailing for any particular machine condition.

Figure 6:
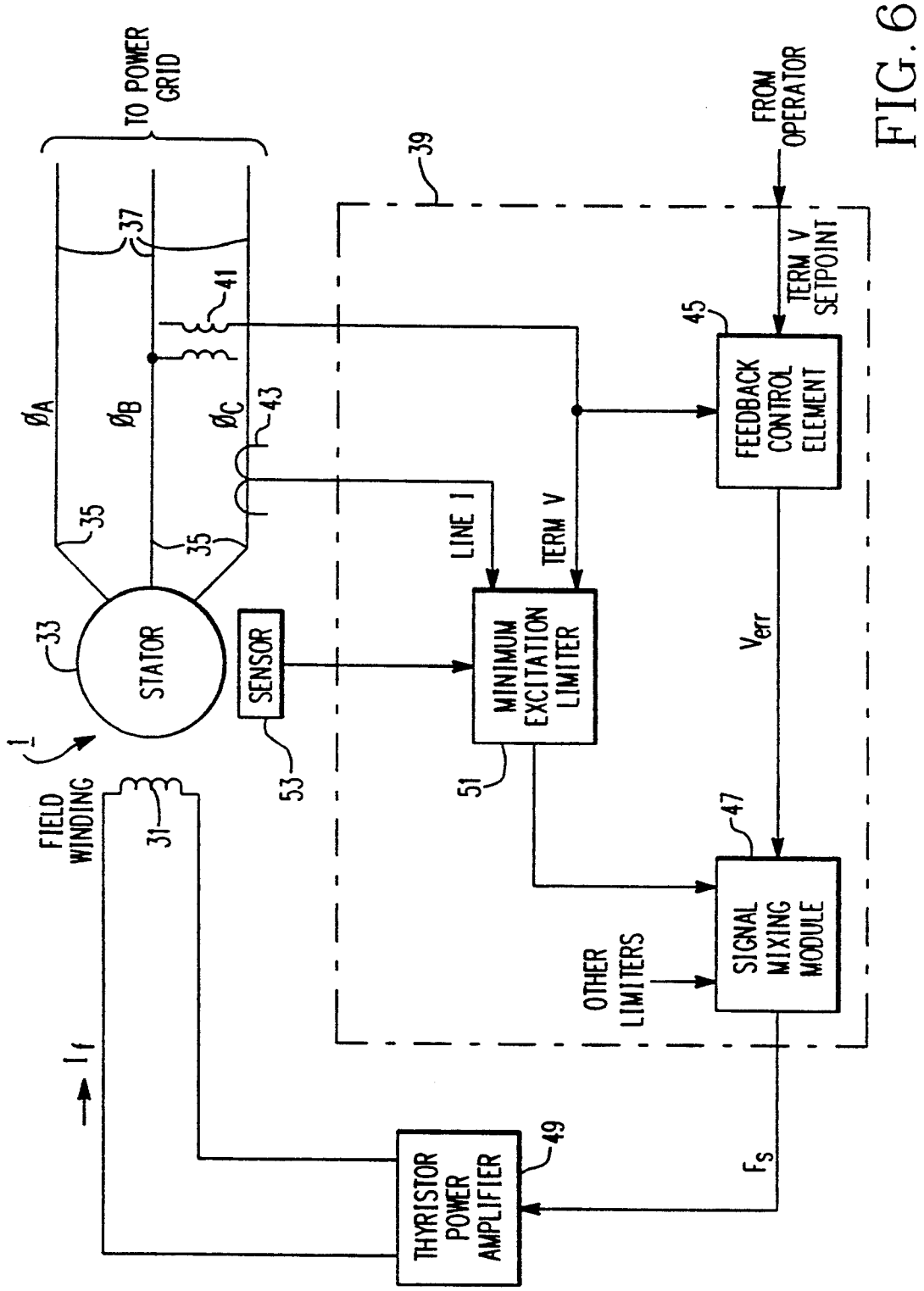
FIG. 6 is a schematic diagram of a control system in accordance with the invention for a synchronous generator connected in a power grid.

FIG. 6 illustrates a control system for a synchronous generator 1 incorporating the invention. The synchronous generator 1 includes a field winding 31 on a rotor which is driven by a prime mover (not shown). The stator 33 of the synchronous machine 1 has a winding which generates three-phase power $\phi_a$, $\phi_b$, and $\phi_c$ at the terminals 35. This three-phase power is connected to a power grid by leads 37.

The synchronous generator 1 is controlled by an automatic voltage regulator 39 which, in accordance with the invention, is implemented by a microprocessor. A potential transformer 41 monitors the voltage of one of the phases of the generator output. In addition, a current transformer 43 monitors the current in one of the phases of the output. A feedback control element 45 within the voltage regulator 39 generates a voltage error signal, $V_{err}$, between a terminal voltage set point signal provided by an operator, and the feedback terminal voltage signal, TERM V, obtained from the potential transformer 41. A signal mixing module 47 applies several limits to the terminal voltage error signal, $V_{err}$, generated by the feedback control element 45, and sends a resultant firing signal, $F_S$ to a thyristor power amplifier 49 which provides dc exciter or field current $I_f$ to the field winding 3.

The signal mixing module 47 applies a limit on the minimum excitation provided to the synchronous machine, in addition to other limits, such as, for example, maximum excitation and volts per hertz. The minimum excitation limit is provided to the signal mixing module 47 by a minimum excitation limiter module 51 within the automatic voltage regulator 39. The minimum excitation limiter module 51 utilizes the terminal voltage provided by the potential transformer 41 and the current, LINE I, provided by the current transformer 43 to generate the minimum excitation limit signal in a manner to be discussed more fully below.

The signal mixing module 47 compares the terminal voltage error signal, $V_{err}$ from the feedback control element 45 with the various limiter signals and selects the appropriate signal to be applied to the thyristor power amplifier 49 as the firing signal. For instance, in the case where the operating point of the machine is below the selected limit as determined by the minimum excitation limiter module 51 from the voltage and current monitored by the potential transformer 41 and current transformer 43, a limit signal is generated which overrides the terminal voltage error signal and increases excitation of the synchronous machine 1.

The synchronous machine 1 is typically cooled by circulation of a pressurized coolant through the machine. In accordance with the invention, a sensor 53 provides a signal to the minimum excitation limiter module 51 representative of the effectiveness of the coolant system which can be used by the limiter to adjust the generation of the limit signal based upon the cooling of the machine. Typically, the sensor 53 would measure the coolant pressure.

Figure 7:
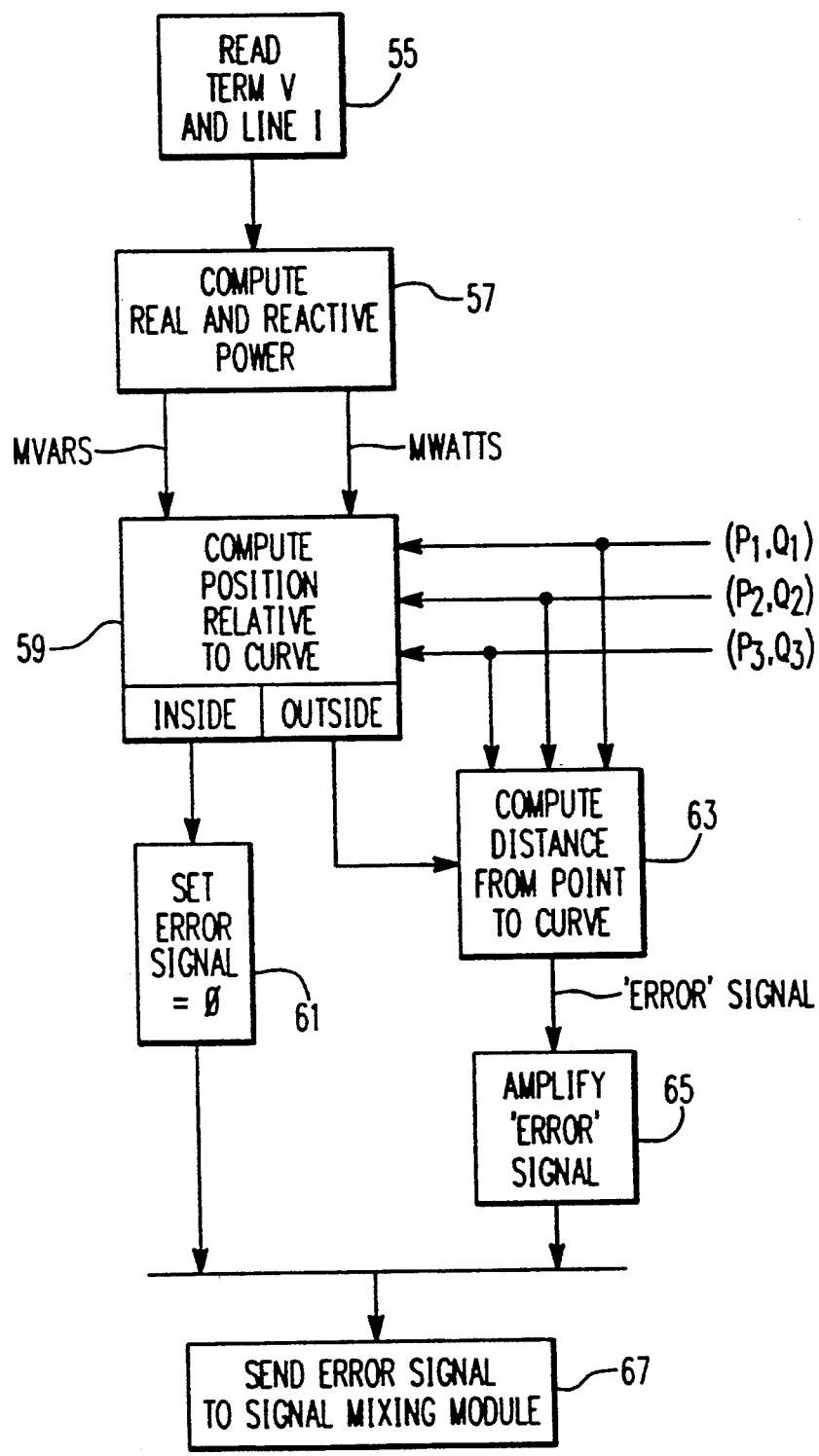
FIG. 7 is a diagram of a suitable software program for implementing the invention in the control system illustrated in FIG. 6.

FIG. 7 illustrates a flow chart of a suitable computer program used by the minimum excitation limiter module 51. First, the terminal voltage and line current are read in from the potential transformer 41 and the current transformer 43, respectively at 55. This current and voltage is used to compute at 57 the real (MWATTS) and reactive (MVARS) power generated by the synchronous machine 1. These real and reactive power components are then used at 59 to determine the location of the operating point of the machine in the real/reactive power plane relative to the selective protection curve established by the coordinates of the one or more straight line segments inputted by an operator through a programming terminal. If the operating point is inside the selected limit, the error signal is set to zero at 61. If the operating point is outside of the selected limit, the distance of the calculated operating point from the protection curve is computed at 63. This "error signal" is then amplified at 65 and transmitted to the signal mixing module at 67. This error signal will act through the signal mixing module 47 to manipulate the machine excitation to move the operating point to within the safe operating region.

As previously mentioned, the invention provides great flexibility in selecting the characteristic of the minimum excitation limiter, and may include a combination of limit profiles.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for controlling a synchronous machine connected to an electrical power grid, said apparatus comprising:

a voltage regulator controlling excitation of said synchronous machine to regulate voltage on the machine and minimum excitation means including characterizing means characterizing as a function of real and reactive power a machine capability limit and a system stability limit, and means monitoring said excitation and applying to said voltage regulator a signal which increases excitation when said excitation is below either said stability limit or said machine capability limit.

2. Apparatus for controlling a synchronous machine connected to an electrical power grid, said apparatus comprising:

a voltage regulator controlling excitation of said synchronous machine to regulate voltage on the machine and minimum excitation means including characterizing means characterizing as a function of real and reactive power a machine capability limit and a system stability limit, and means monitoring said excitation and applying to said voltage regulator a signal which increases excitation when said excitation is below either said stability limit or said machine capability limit, wherein said characterizing means characterizes said machine capability limit as at least one first line segment, and said system stability limit as at least one second line segment which intersects said first line segment.

3. Apparatus for controlling a synchronous machine connected to an electrical power grid, said apparatus comprising:

a voltage regulator controlling excitation of said synchronous machine to regulate voltage on the machine;

minimum excitation means including characterizing means characterizing as a function of real and reactive power a machine capability limit, and means monitoring said excitation and applying to said voltage regulator a signal which increases excitation when said excitation is below said machine capability limit; and means monitoring cooling effectiveness of said synchronous machine, and wherein said characterizing means includes means adjusting said characterizing of said machine capability limit in response to said means monitoring cooling effectiveness of said machine.

4. Apparatus for controlling a synchronous machine connected to an electrical power grid, said apparatus comprising:

a voltage regulator controlling excitation of said synchronous machine to regulate voltage on the machine; and minimum excitation means including digital processor means characterizing as a function of real and reactive power in at least one first straight line segment a minimum limit on said excitation, and means applying to said voltage regulator a limit signal which increases excitation when said excitation is below said minimum limit, wherein said processor means includes means characterizing a system stability limit on minimum excitation as at least one second straight line segment, and wherein said means applying to said voltage regulator a limit signal which increases excitation comprises means which increases excitation when said excitation is below said system stability limit.

5. Apparatus for controlling a synchronous machine connected to an electrical power grid, said apparatus comprising:
- a voltage regulator controlling excitation of said synchronous machine to regulate voltage on the machine; and
- minimum excitation means including digital processor means characterizing as a function of real and reactive power in at least one first straight line segment a minimum limit on said excitation, and means applying to said voltage regulator a limit signal which increases excitation when said excitation is below said minimum limit, wherein said processor means includes means characterizing a machine capability limit on minimum excitation as at least one second straight line segment, and wherein said means applying to said voltage regulator a limit signal which increases excitation comprises means which increases excitation when said excitation is below said machine capability limit.

6. Apparatus for controlling a synchronous machine connected to an electrical power grid, said apparatus comprising:
- a voltage regulator controlling excitation of said synchronous machine to regulate voltage on the machine; and
- minimum excitation means including digital processor means characterizing as a function of real and reactive power in at least one first straight line segment a minimum limit on said excitation, and means applying to said voltage regulator a limit signal which increases excitation when said excitation is below said minimum limit;
- wherein said processor means includes means characterizing a machine capability limit on minimum excitation as at least one second straight line segment which intersects said at least one first straight line segment; and
- cooling means monitoring cooling effectiveness of said synchronous machine and wherein said processor means includes means adjusting said characterizing of said machine capability limit in response to said cooling means.

7. Apparatus for controlling a synchronous machine connected to an electrical power grid, said apparatus comprising:
- a voltage regulator controlling excitation of said synchronous machine to regulate voltage on the machine; and
- minimum excitation means including digital processor means characterizing a loss of field limit on minimum excitation as a function of real and reactive power in at least one straight line segment which closely correlates with said trip function characteristic with a selected margin, and means applying to said voltage regulator a limit signal which increases excitation when said excitation is below said loss of field limit.

* * * * *